United States Patent [19]

Steegmueller et al.

[11] Patent Number: 5,603,154
[45] Date of Patent: Feb. 18, 1997

[54] PROCESS FOR IMPROVING THE RUN-IN CHARACTERISTICS OF DRIVES HAVING SINTERED BEARINGS

[75] Inventors: Horst Steegmueller, Wuerzburg; Alfred Kuemmel, Kitzingen, both of Germany

[73] Assignee: Siemens Aktiengesellschaft, Germany

[21] Appl. No.: 690,952

[22] Filed: Aug. 1, 1996

Related U.S. Application Data

[63] Continuation of Ser. No. 278,306, Jul. 21, 1994, abandoned.

[30] Foreign Application Priority Data

Sep. 30, 1993 [EP] European Pat. Off. ............... 93115807

[51] Int. Cl.⁶ ............... H02K 15/00; B23P 9/00
[52] U.S. Cl. ............... 29/596; 29/89.5; 29/898.54; 29/898.1; 29/898.13
[58] Field of Search ............... 29/89.5, 898.02, 29/898.054, 898.1, 898.13, 596; 419/27, 28; 384/902

[56] References Cited

U.S. PATENT DOCUMENTS 3,430,322  3/1969  Henle et al. ............... 29/898.13
4,290,655  9/1981  Apuzzo et al. ............... 384/902 X
4,776,885  10/1988  Nakagawa et al. ............... 29/898.1 X

FOREIGN PATENT DOCUMENTS 0509263  3/1992  European Pat. Off. .

OTHER PUBLICATIONS

M. Muller–Brodmann; Sinterlager in der Feinwerktechnik, 1990.

SU1626105; 1991 (Abstract).

SU1622670; 1991 (Abstract).

Primary Examiner—S. Thomas Hughes

[57] ABSTRACT

A process for improving the run-in characteristics of drives having sintered bearings. The drives are subject, prior to their operational usage in repeated cycles (I; II etc.), to a loading procedure exhibiting respectively a first load ($M_1$), with the effect of operating of the sintered bearings in the mixed friction region (MR), and a following transition to a second load ($M_A$, with the effect of operation of the sintered bearings in the boundary friction region (GR).

8 Claims, 1 Drawing Sheet

PROCESS FOR IMPROVING THE RUN-IN CHARACTERISTICS OF DRIVES HAVING SINTERED BEARINGS

This application is a continuation of application Ser. No. 08/278,306, filed 21 Jul. 1994 and now abandoned.

FIELD OF THE INVENTION

The invention relates to a process for improving the run-in characteristics of drives having sintered bearings.

BACKGROUND OF THE INVENTION

A drive having sintered bearings is shown for example, in EP-A2-0 509 263, which shows a geared motor for a motor vehicle window-lifter drive. As shown, the rotor shaft extends into a gear case that is flange-mounted on the motor frame of a commutor motor, and drives by means of a worm shaft, a worm wheel which is coupled to the cable pulley of a Bowden cable type window-lifter. The rotor shaft is mounted in at least one sintered bearing, which, due to the contact pressures acting upon the flanks of the worm shaft, is also subjected, in particular to radial stress. In geared motor drives of this type, which are made as mass-produced products, the torques developed are subject to a certain scattering. It has been shown that the differences in the starting torques of these geared motor drives are based upon differences in the sintered slide bearings which are used.

An article "Sintered Bearings in Precision Engineering" in the magazine "Fienwerktechnik & Meβtechnik 98 (1990) 12, pp. 535–538, indicates that sintered bearings display, during run-in, a metallic contact. This is because the porous inlets of the bearing on the running surface are initially open, and hence a large part of the oil in the pressure region of the bearing gap, which is in fact necessary to develop a lubricating wedge, is forced into pore ducts and thus makes the development of a load-bearing oil film more difficult. As a consequence, such bearings operate only in a region of so-called "mixed friction" instead of in a fluid-friction region, which is actually desired.

The above-mentioned operations as to sintered slide bearings can be deduced by applying known laws of hydrodynamic lubrication to solid slide bearings Specific "Stribeck curves", as they are known, can be measured for each type of drive and represent the functional dependence of the bearing friction coefficient "μ" upon the radial load and upon the rotation speed "n". It can be demonstrated, in particular, that in terms of such curves, the transition from the fluid friction zone into the mixed friction zone and the preceding boundary friction zone is substantially lower in the case of sintered slide bearings than in the case of solid slide bearings.

SUMMARY OF THE INVENTION

Based upon the above-mentioned finding, the object of the invention is to improve, with simple means and with low time expenditure, the run-in characteristics of drives having sintered bearings, in particular geared motors having wormgears for window-lifter or sliding-roof drives in motor vehicles, such that only a low scattering of the starting torque of the mass-produced drives is obtained. This object is successfully achieved, according to the invention, by virtue of a process comprising: operating the drive according to a run-in process composed of a series of repeated loading cycles wherein each loading cycle comprises, a) first, imposing a load torque on the operating drive that causes the sintered metal bearings to exhibit a bearing friction coefficient that lies within a mixed friction region wherein the sintered metal bearings are lubricated without creating a hydrodynamic lubrication effect, and b) then imposing increasing load torque on the operating drive that causes the sintered metal bearings to exhibit a bearing friction coefficient that lies within a boundary friction region wherein the bearing friction coefficient is greater than that in the mixed friction region.

By virtue of the specific load, according to the invention, an initial braking torque corresponding to a mixed friction load results in a subsequent brief retardation and standstill, and hence a load in the boundary friction zone, and due to the intensive passage through the mixed and boundary friction regions or zones imparted thereby, plastic deformation of the bearing surface, with the effect of closing the pores, is thereby guaranteed, both positionally accurately in the respective individual operational load zone of the motor and, under the shortest possible run-in time, without inadmissible heating of the motive electric motor. In addition to the improvement of the properties of the sintered bearing, the running surface of the rotor shaft itself is also improved here, so that the power output of the drives can not only be improved comparatively amongst themselves but also in overall terms.

The process according to the invention is explained in greater detail below with reference to two functional representations in the drawing.

DESCRIPTION OF THE PREFERRED EMBODIMENT

Figure 1:
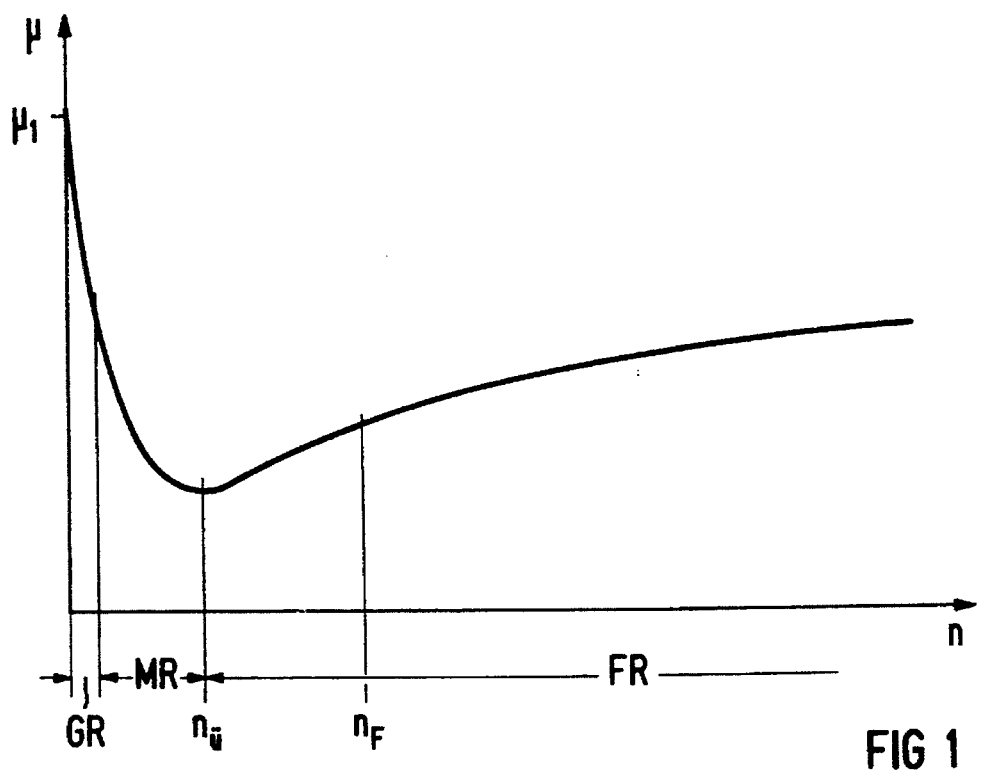
FIG. 1 shows a so-called "Stribeck curve" for a certain type of drive having sintered bearings, in particular of a geared motor having a worm gear for a window-lifter drive in a motor vehicle.

FIG. 1 shows the so-called "Stribeck curve" of a type of drive, which in the present case is a window-lifter drive having a worm gear driven by a commutator. The Stribeck curves herein indicate the functional dependence of the bearing friction coefficient "μ" upon the radial load and the rotation speed "n". In the so-called "boundary friction region" GR, there is still virtually no lubricating effect is present, so that a dry friction can be assumed. In the following mixed friction region MR, although a lubricating effect is already present, no lubricating effect is present, so that a dry friction can be assumed. In the following mixed friction region MR, although a lubricating effect is already present, no lubricating wedge, which has the effect of hydrodynamic lubrication, is yet developed. The actual operating usage is characterized by the so-called "fluid friction region" FR, starting at a rotation speed "$n_F$". In this fluid friction region, lubricant pressure builds in dependence upon the increasing rotation speed and the radial load, leading to floating of the rotor shaft or worm shaft in the sintered bearings, and hence to separation between the shaft and bearing body.

Figure 2:
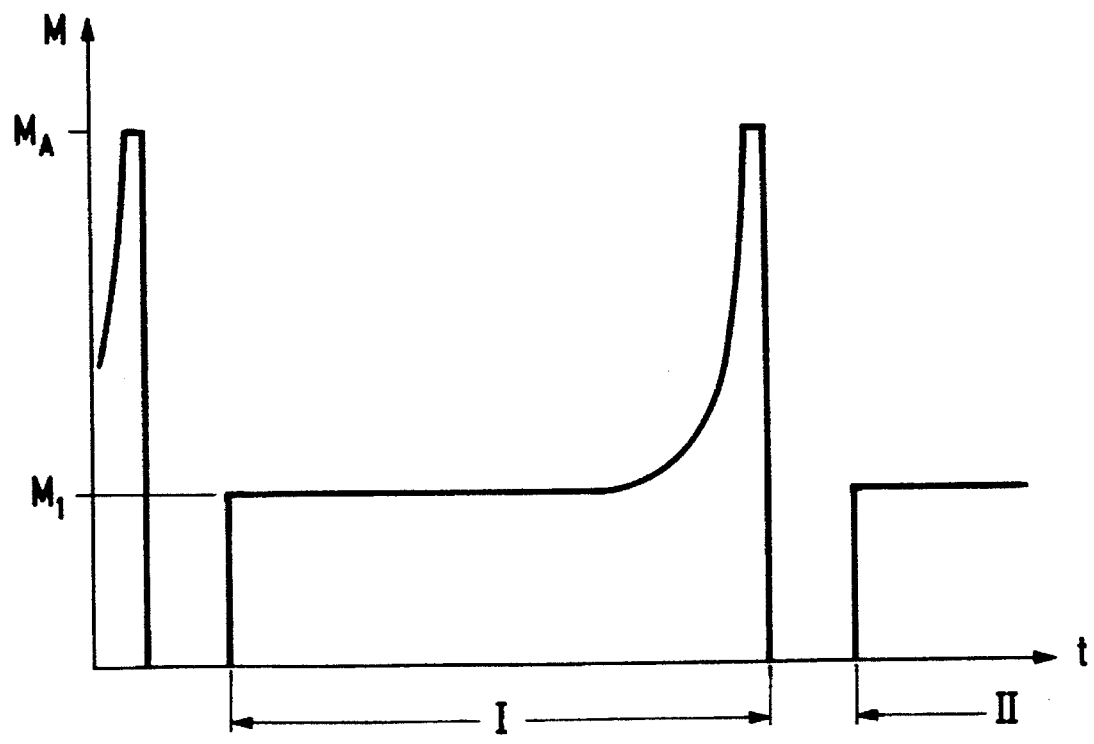
FIG. 2 shows the loading procedure according to the invention for improving the run-in characteristics.

FIG. 2 shows a cycle I and the start of a succeeding repeated cycle II representing a loading procedure, according to the invention, for improving the run-in characteristics. For this purpose, a load torque $M_1$ is specified for the drive, preferably using a drivable magnetic powder brake, such that the shaft operates just below the transitional rotation speed $N_ü$ based on the Stribeck curve according to FIG. 1, and thus the bearing characteristic is in the mixed friction region MR.

The load torque $M_1$ corresponds approximately to the driving torque which is necessary to move the window pane between its lower stop and its upper stop in the door frame of a motor vehicle. After this loading under the load torque $M_1$, the motor is then retarded, involving transition of the bearing characteristic into the boundary friction region GR, finally coming to a standstill at a torque load $M_A$.

This load cycle is repeated several times, there being expediently provided, between the individual cycles I and II etc., short load intervals during which, on the one hand, the brake generating the load is reset to its new load value, and on the other hand, the drive, having previously been subjected to load, is able to cool down. The load cycles are repeated until an improvement has come about in the run-in characteristics, in particular due to a specific increase in the starting torque of the drive.

The transition between the load in the mixed friction region MR, on the one hand, and the following boundary friction region GR, on the other hand, is realized according to an advantageous embodiment of the invention such that the electrical energy which is consumed by the motive communicator motor is minimized; expediently a transition of this type is realized hyperbolically or parabolically.

A corresponding device for improving the run-in characteristics contains expedient motor-loading means, in particular a magnetic powder brake, in a loading procedure exhibiting respectively a first load ($M_1$), with the effect of operation of the sintered bearings in the mixed friction region (MR), and a following transition to a second load ($M_A$), with the effect of operation of the sintered bearings in the boundary friction region (GR).

In addition, control means are advantageously provided for increasing the load torque between the first load $M_1$ and the second load $M_A$ with the effect of minimal energy consumption of the drive, in particular the electrical energy consumption (IOU) of an electrical geared motor. According to certain embodiments, the hyperbolic or parabolic transition function has proved particularly expedient by effecting a run-in operation which is fast and effective without, however, being burdened by excessive heat stress.

What is claimed is:

1. A process for running-in sintered metal bearings of an induction motor drive prior to its placement in service, comprising:

coupling the induction motor drive to an apparatus having a selectively variable torque load, prior placement of the motor in operational service;

driving the selectively variable torque load with the drive through a predetermined loading cycle which includes repetitive respective steps of:

setting the variable load torque to a first level which causes the bearings to be operated within a mixed friction lubrication mode, without consistent hydrodynamic lubrication;

increasing the variable torque load to a second level which causes the bearings to be operated within a boundary friction lubrication mode; and intentionally terminating the loading cycle driving and removing the drive from the apparatus, so that the drive may be placed in service.

2. The process of claim 1, wherein the variable load torque first level is set to cause the bearings to be operated below and proximal to transition from mixed friction lubrication mode to hydrodynamic lubrication mode.

3. The process of claim 1, wherein the variable load torque second level is set to cause the drive to stop driving rotation.

4. The process of claim 1, wherein the variable torque load is increased from the first to second level in a manner which minimizes energy consumption of the drive.

5. The process of claim 1, wherein the variable torque load is increased from the first to second level parabolically as a function of time.

6. The process of claim 1, wherein the variable torque load is increased from the first to second level hyperbolically as a function of time.

7. The process of claim 1, wherein no load is applied to the drive between repeated loading cycles.

8. The process of claim 7, wherein time between loading cycles is selected to facilitate drive cooling.

* * * * *